United States Patent [19]

Payne

[11] Patent Number: 4,677,384
[45] Date of Patent: Jun. 30, 1987

[54] TARGET-IDENTIFYING METAL DETECTOR

[75] Inventor: George C. Payne, Sweet Home, Oreg.

[73] Assignee: Teknetics, Inc., Lebanon, Oreg.

[21] Appl. No.: 777,669

[22] Filed: Sep. 19, 1985

[51] Int. Cl.[4] .................. G01V 3/11; G01V 3/08; H03H 12/00

[52] U.S. Cl. .................. 324/329; 324/233; 307/510; 328/133

[58] Field of Search .................. 324/233, 326–329, 324/830, 990; 328/133, 155; 307/358, 510, 514, 515, 529

[56] References Cited

U.S. PATENT DOCUMENTS 4,507,612  3/1985  Payne .................. 324/329

Primary Examiner—Ernest F. Karlsen
Assistant Examiner—Walter E. Snow
Attorney, Agent, or Firm—Christensen, O'Connor, Johnson & Kindness

[57] ABSTRACT

The target signal produced by the receive coil of an induction-balance metal detector is demodulated and filtered in matched $V_X$ and $V_R$ demodulator and filters (11, 13) driven by quadrature versions (TA/TB) of the signal that drives the transmit coil of the detector. The resultant phase quadrature signals—$V_X$ and $V_R$—are applied to a ramp computer (15) that internally produces a ramp signal whose slope is a function of the magnitude of the sum of the $V_X$ and $V_R$ signals. The ramp computer (15) inludes a comparator that combines the ramp signal with a fixed signal whose magnitude is a function of the magnitude of the $V_X$ signal. The result is a pulse whose width is a function of the phase angle and, thus, the identity of the target that created the $V_X$ and $V_R$ signals. The pulse is integrated (17) and the results stored at a TI voltage whose magnitude is functionally related to the identity of the target. The TI voltage is used to control the state of a display (23) calibrated in terms of target identity. A controller (37) that controls the foregoing operations is subject to preventing the display from occurring when a discriminate circuit (25) determines that the TI voltage denotes a target (such as a nail) that is not of interest. The discrimination disablement of the display is subject to being overridden by a signal from a target-select circuit (27) when the TI voltage denotes a target of interest, (e.g., a nickel) falling within the phase angle range that is normally subject to discrimination. Further, the controller (37) only allows the detection sequence to operate if the target produces a signal having a magnitude above a minimal level. The controller is also subject to being overridden by the output of a deep-target circuit (35) designed to be operator-enabled when the detector is being used to locate deeply buried targets in ground having a low mineralization content.

19 Claims, 7 Drawing Figures

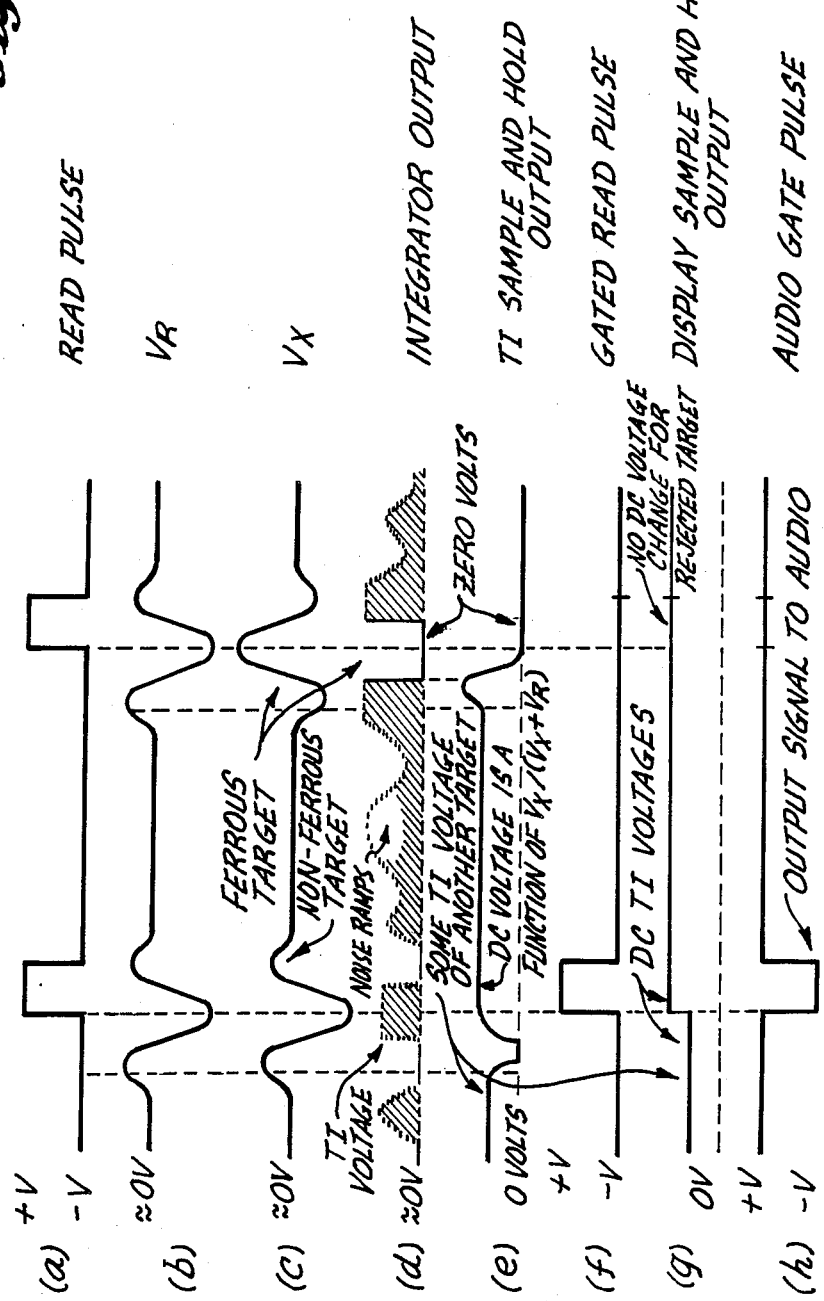

TARGET-IDENTIFYING METAL DETECTOR

TECHNICAL AREA

This invention is directed to metal detectors and, more particularly, metal detectors having the ability to identify the specific types of metal objects (e.g., targets) that are detected.

BACKGROUND OF THE INVENTION

As used in this application, the term "metal detector" is intended to mean metal detectors of the type used by individuals to locate buried metal objects, particularly valuable metal objects. Such metal detectors are to be contrasted with other types of metal detectors, such as military metal detectors used to locate mines, commercial metal detectors used to locate pipes and other large metal objects, and security metal detectors used in airports and other areas to locate lethal weapons (such as knives and guns). While some of the principles involved in the present invention may be useful in these other types of metal detectors, it is to be kept in mind that the invention was developed for use with metal detectors used to locate valuable metal objects buried in the ground and is expected to find its main use in such detectors.

In the past, two major types of valuable metal detectors have been marketed—beat frequency oscillator and induction-balance metal detectors. The present invention is directed to induction-balance type metal detectors, which are sometimes also referred to as transmit-receive (T/R) metal detectors.

Induction-balance metal detectors include transmit and receive coils, plus other related coils (such as feedback and null coils) mounted in a detector head. Preferably, the main coils, i.e., the transmit, receive and feedback coils, are coaxially mounted. In some detectors these coils are coplanar, as well as coaxial. In any event, the transmit coil is driven by an oscillator and the coils are formed, sized, and positioned such that the receive coil produces substantially no output signal in the absence of a metallic object (including mineralized ground) disrupting the magnetic field produced by the transmit coil. Metallic objects of both a ferrous and nonferrous nature disrupt the magnetic field produced by the transmit coil; however, in different manners. In the case of ferrous objects, the magnetic field is concentrated by the ferrous objects. In the case of nonferrous objects, eddy currents are produced in the objects that, in turn, produce magnetic fields. The eddy current produced magnetic fields dissipate the magnetic field produced by the transmit coil, in the region of the object. In either case, the magnetic field produced by the transmit coil is disrupted in a manner that generates a voltage in the receive coil. If the ground is mineralized, it generates a voltage in the receive coil having some similarity to that produced by a ferrous object. (while the receive coil voltage is similar in some respects, it is dissimilar in others. For example, a ferrous object creates a voltage pulse when the detector head passes over the object whereas the ground-produced voltage is relatively uniform.)

Induction-balance or T/R metal detectors have evolved dramatically over the past couple of decades. A brief discussion of the evolution of induction-balance or T/R metal detectors is described in the introductory portion of U.S. Pat. No. 4,507,612, entitled "Metal Detector Systems for Identifying Targets in Mineralized Ground" by George C. Payne. U. S. Pat. No. 4,507,612 describes a significant advance in the metal detector art, namely an induction-balance metal detector having the ability to specifically identify a particular type of metallic target while the target remains buried in the ground, including buried in mineralized ground. Prior metal detectors could only distinguish between ferrous and nonferrous targets. They could not identify the specific type of ferrous or nonferrous target.

While metal detectors of the type described in U.S. Pat. No. 4,507,612 have been eminently successful in identifying the nature of metal targets based on the production of an X/R quotient signal whose value is related to the phase angle of the target, they have certain disadvantages. For example, they are more complicated and, therefore, more expensive to produce than desirable. That is, the electronic circuitry described in U.S. Pat. No. 4,507,612 for producing an X/R quotient signal is relatively sophisticated. Because the circuitry is sophisticated, i.e., complex, embodiments of the invention described in this patent are more expensive to produce than desirable. Further, the target X/R quotient signal produced by metal detectors of the type described in U.S. Pat. No. 4,507,612 are related to the phase angle of targets in a nonlinear manner. As a result, a nonlinear amplifier is needed to space the readings properly on a visual display.

One approach to overcoming the foregoing and other disadvantages of metal detectors of the type described in U.S. Pat. No. 4,507,612 is described in U.S. patent application Ser. No. 556,379 filed Nov. 30, 1983 and entitled "Audible and Visual Target-Identifying Metal Detector" by Richard E. Hirschi. While the invention described in U.S. patent application Ser. No. 556,379 overcomes some of the disadvantages of the metal detector described in U.S. Pat. No. 4,507,612, some disadvantages remain. For example, while the metal detector described in U.S. patent application Ser. No. 556,379 is substantially less complicated than the metal detector described in U.S. Pat. No. 4,507,612, it is still more complicated than desirable. Further, the metal detector described in U.S. patent application Ser. No. 556,379 lacks a number of desirable features. For example, it does not have the ability to detect a target falling within a range of targets to be discriminated against. In this regard, the phase angle of some desirable targets, such as nickels, fall within the range of targets that are normally considered undesirable and, thus, discriminated against, such as nails and other ferrous objects, pull tabs, and aluminum foil. It would be desirable to provide a metal detector having the ability to selectively detect desirable targets, such as nickels, that fall within the range of undesirable targets. Another disadvantage of prior target identifying metal detectors relates to their inability to locate deeply buried targets in the presence of shallow buried targets becaue of the high magnitude signals created by shallow targets electronically hide the lower magnitude signals created by deep targets. In this regard, it should be noted that deep targets are more likely to be valuable than shallow targets, which are more likely to be nails, pull tabs and foil. Thus, it would be desirable to provide a metal detector having the ability to ignore signals created by shallow targets and respond to signals created by deep targets. The present invention is directed to providing a metal detector having the foregoing and other features and advantages.

SUMMARY OF THE INVENTION

In accordance with this invention, a target-identifying metal detector is provided. The metal detector combines the $V_X$ and $V_R$ signals produced by a pair of demodulators driven in phase quadrature by the same signal that drives the transmit coil of an induction-balanced metal detector. The $V_X$ and $V_R$ signals are combined to produce a ramp signal whose slope is a function of the sum of the magnitudes of the $V_X$ and $V_R$ signals. The ramp signal is combined with a signal whose magnitude is a function of the magnitude of the $V_X$ signal. The result of the combination is a pulse whose width is a function of the phase angle and, thus, the identity of the target that created the $V_X$ and $V_R$ signals. The pulse is integrated to create a signal whose magnitude is functionally related to the identity of the target. The thusly created TI signal is used to control the state of a visual display calibrated in terms of target identity.

In accordance with other aspects of this invention, the foregoing sequence of operation is controlled by a controller that receives timing signals that are related to the signals driving the phase quadrature demodulators and the transmit coil of the induction-balance metal detector, but at a lower frequency. The controller controls the functional operation of the target-identifying metal detector of the invention such that a target display is created only when the target signal demodulated by the demodulators is above a predetermined minimal level.

In accordance with still other aspects of this invention, a discriminate circuit analyzes the TI signal and prevents the controller from creating a target display when the TI signal magnitude denotes a target having a phase angle that falls within a range of phase angles of targets not of interest to the user, i.e., a range of junk targets.

In accordance with still further aspects of this invention, a target select circuit also analyzes the TI signal. When the TI signal denotes a target of interest, even though the TI signal falls within the range of junk targets being discriminated against by the discriminate circuit, the target select circuit enables the controller to create a display.

In accordance with yet other aspects of this invention, a deep-target circuit analyzes the magnitude of the $V_R$ signal. When high magnitude signals of the type created by shallow targets occur, the deep target circuit prevents the controller from allowing such signals to create a display. The deep target circuit is subject to operator enablement. Thus an operator can use the metal detector to only locate and identify deeply buried targets, particularly in ground having low mineralization content.

As will be readily appreciated from the foregoing summary, the invention provides a relatively uncomplicated target-identifying metal detector. Because the target-identifying metal detector requires a minimal signal strength in order to be made operative, the operator frustrations associated with attempting to locate unidentifiable targets in highly mineralized ground is avoided. In addition to providing a relatively uncomplicated circuit for determining the phase angle and, thus, the identify of a target, the invention provides discrimination against a whole range of undesirable targets. Even though a whole range of undesirable targets is discriminated against, desirable targets having a phase angle falling within the discrimination range can still be detected. Because the invention provides a mechanism for preventing displays created by shallow targets that produce large magnitude signals, the invention is ideally suited for locating deeply buried targets, particularly in low mineralization ground.

BRIEF DESCRIPTION OF THE DRAWINGS

The foregoing and other advantages of this invention will become more readily appreciated as the same becomes better understood by reference to the following detailed description taken in conjunction with the accompanying drawings wherein.

DESCRIPTION OF THE PREFERRED EMBODIMENT

Figure 1:
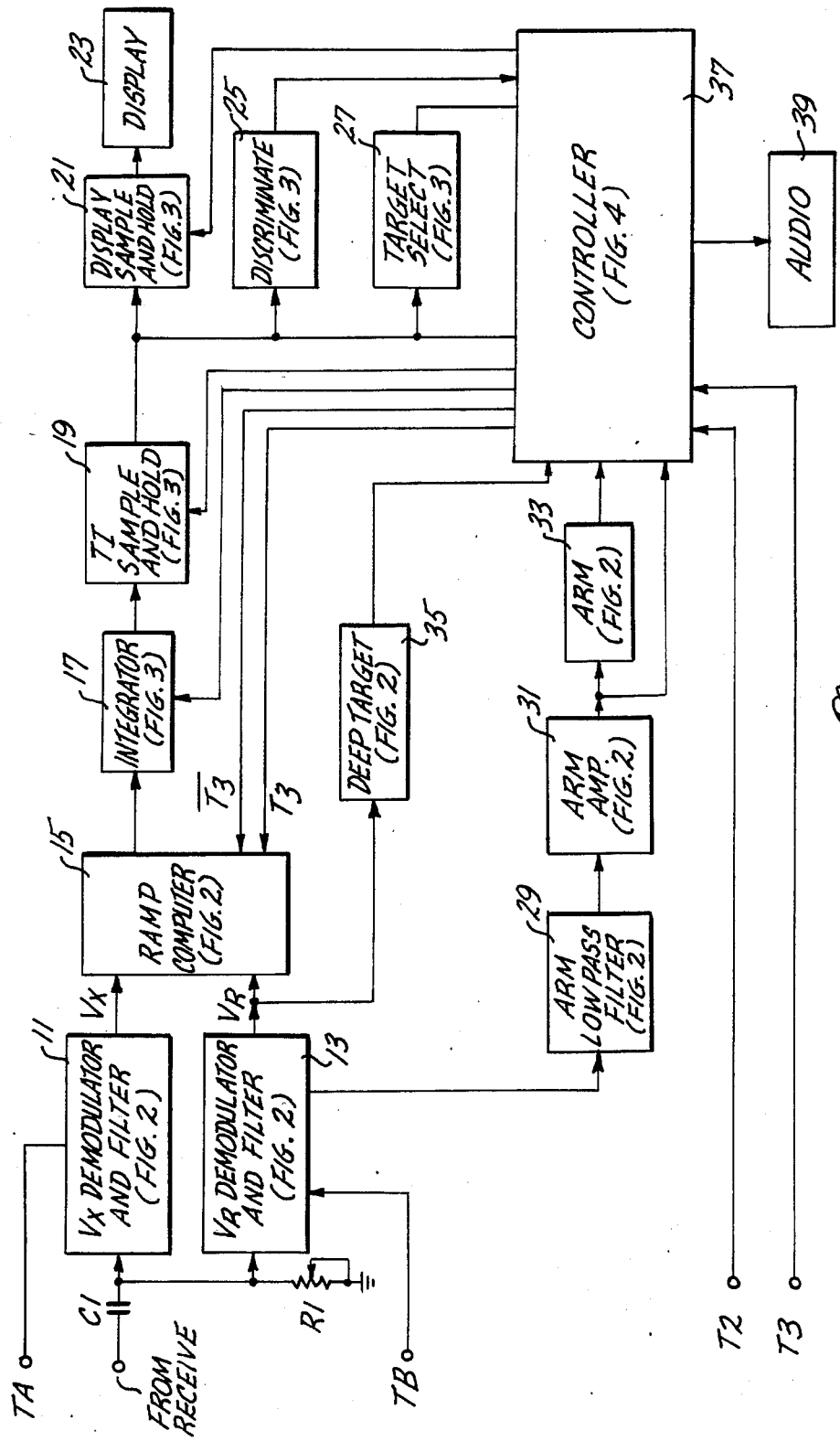
FIG. 1 is a block diagram of the signal analysis and control circuitry of a target-identifying metal detector formed in accordance with the invention.

FIG. 1 illustrates in block form, the signal analysis and control circuitry of a target-identifying metal detector formed in accordance with the invention. The detector head and other target signal production circuitry of an induction balance or T/R type metal detector is not illustrated, since such circuitry is well known in the target-identifying metal detector art. See for example U.S. Pat. No. 4,507,612, referenced above. As described in this patent, the transmit coil of an induction balance metal detector is driven at a fixed frequency that creates a magnetic field coupled to a receive coil. The receive coil produces a signal that both contains $V_X$ and $V_R$ information when the coupling magnetic field is disrupted by a metal target. The $V_X$ component of the signal represents the reactance of the metal target and the $V_R$ component represents the resistance of the metal target. The phase angle defined by the $V_X$ and $V_R$ components uniquely identifies the metal target.

After being amplified, the receive coil signal containing the $V_X$ and $V_R$ information is applied to the signal analysis and control circuitry illustrated in FIG. 1. The signal analysis and control circuitry illustrated in FIG. 1 comprises: a $V_X$ demodulator and filter circuit 11; a $V_R$ demodulator and filter circuit 13; a ramp computer 15; an integrator 17; a TI sample and hold circuit 19; a display sample and hold circuit 21; a display 23; a discriminate circuit 25; a target select circuit 27; an arm low-pass filter 29; an arm amplifier 31; an arm circuit 33; a deep target circuit 35; a controller 37; and, an audio circuit 39.

The signal containing the $V_R$ and $V_X$ information produced by the receive coil amplifier when the detector head passes over a metal target is applied through a coupling circuit formed by a capacitor designated C1 and an adjustable resistor designated R1. More specifically, C1 is connected in series with R1 between the output of the receive coil amplifier and ground. The junction between C1 and R1 is connected to the inputs of the $V_X$ and $V_R$ demodulator and filter circuits 11 and 13. The $V_X$ and $V_R$ demodulators and filter circuits each receive a demodulation signal. The demodulation signals are quadrature signals, as indicated by the identifiers TA and TB, and are at the same frequency as the signal applied to the transmit coil of the detector head. Because the demodulation signals are quadrature related, the $V_X$ demodulators filters are quadrature demodulators. The $V_X$ and $V_R$ signals formed at the outputs of the $V_X$ and $V_R$ demodulators and filter circuits are applied to the ramp computer 15.

As will be better understood from the following description, the ramp computer 15 includes a ramp circuit that produces a ramp signal having a slope that is a function of the sum of the magnitude of the $V_X$ and $V_R$ signals. The ramp circuit 15 also includes a comparator for combining the ramp signal with a signal whose magnitude is controlled by the $V_X$ signal in a manner that creates an output pulse whose width is a function of the phase angle of the target that produced the $V_X$ and $V_R$ signals. Since the phase angle uniquely identifies a target, the width of the pulses produced by the ramp computer uniquely identifies targets.

The output from the ramp computer 15 is applied to integrator 17, which converts to get information from the pulse width form to voltage magnitude form. The output of the integrator 17 is applied to the TI sample and hold circuit 19. The TI sample and hold circuit 19 periodically interrogates the output of the integrator 17 and stores the resultant voltage magnitude information.

The output of the TI sample and hold circuit 19 is applied to the display sample and hold circuit 21, the discriminate circuit 25, and the target select circuit 27. When enabled by the controller 37, the display sample and hold circuit 21 samples the signal stored by the TI sample and hold circuit 19, stores the result, applies it to the display 23. The display 23 is calibrated in terms of target identity.

The discriminate circuit 25 analyzes the signal stored by of the TI sample and hold circuit to determine if the signal was created by a target of interest. Targets of little or no interest (i.e., junk targets) such as ferrous objects, pull tabs and aluminum foil have phase angles that fall within one range. Most valuable targets have phase angles that fall within another range. The preferred embodiment of the invention is designed such that junk target phase angles cause the integrator to create low voltages. If the voltage magnitude of the TI sample and hold signal falls in the junk target range the discrimate circuit 25 prevents the controller 37 from enabling the display sample and hold circuit 21.

The target select circuit 27 also analyzes the output of TI sample and hold circuit 19 to determine whether the voltage magnitude of the signal stored by the TI sample and hold circuit 19 falls within a range in which a valuable metal target(s) lies. In this regard, some valuable metal targets, such as nickels, have a phase angle that falls within the junk target phase angle range. The target select circuit is designed to allow such valuable targets to be selected regardless of whether they are discriminated against by the setting of the discriminate circuit 25.

The arm low-pass filter 29 is connected to the $V_R$ demodulator and filter circuit 13 is receive a signal produced by the $V_R$ demodulator and filters prior to the final filtering thereof. The arm low-pass filter 29 filters the signal it receives from the $V_R$ demodulator and filter circuit 13 to remove high frequency components and after a short delay applies the filtered signal to the arm amplifier 31, which amplifies the signal. The output of the arm amplifier 31 is applied to the input of the arm circuit 33. The arm circuit 33 produces a rectangular wave output signal whose trailing edge is designed to set a latch in the controller 37 when the signal received from the $V_R$ demodulator and filters exceeds a predetermined level. When the output of the arm amplifier does not exceed the predetermined level, the arm circuit 33 does not produce a rectangular wave signal. As a result, the latch in the controller 37 is not set. The setting of the latch is a precondition to the display sample and hold circuit being enabled to read the signal stored by the TI sample and hold circuit and create a display. Thus, a precondition to creating a display is that the target created signal exceed a predetermined value. The delay created by the arm low-pass filter 29 is chosen such that the TI sample and hold value is read when the target created signal is the strongest.

The deep target circuit 35 is connected to the output of the $V_R$ demodulator and band-pass filter circuit 13 and, thus, receives the $V_R$ signal. When enabled by the operator, the deep target circuit 35 produces an output signal that overrides the arm circuit 33 latch setting signal by resetting the latch immediately after it is set (or maintaining the latch reset) to prevent a display from occurring. The deep target circuit only produces a latch reset signal when the $V_R$ signal voltage exceeds a predetermined magnitude. In this regard, as known to those skilled in the metal detector art, the magnitude of target signals are to some extent related to target depth. Further, some junk targets that are shallowly buried, such as screw caps, produce exceptionally strong target signals. Because valuable targets are frequently buried deeper that junk or less valuable targets, the signals created by shallow targets can distract the operator from more valuable deep targets. In highly mineralized ground it is difficult, if not impossible, to detect deep targets. However, in low mineralized ground deeper targets than normal can be detected if the problem created by a shallow target is eliminated. The deep target circuit is provided to eliminate the problem created by shallow targets. When enabled, the deep target circuit 35, prevents targets that create a strong signal, e.g., shallow targets, from producing a display. Rather, only targets that produce weak signals, e.g., deep targets, cause a display to occur.

In addition to receiving signals from the discriminate circuit 25, the target select circuit 27, the arm amplifier 31, the arm circuit 33 and deep target circuit 35, the controller 37 also receives two timing signals denoted T2 and T3. Preferably, T2 and T3 are related to TA and TB by some multiple. By way of example, TA and TB may be a 6590 Hz signal, T2 may be an 824 Hz signal and T3 may be a 412 Hz signal. Thus the frequency to T2 is twice the frequency of T3 and the freuency of TA/TB is eight times the frequency of T2. While these frequency relationships have been found to be satisfactory in one actual embodiment of the invention, obviously, other frequencies and frequency relationships can be chosen, if desired.

In addition to controlling the ramp computer 15, the integrator 17, the TI sample and hold circuit 19 and the display sample and hold circuit 21 in the manner heretofore described, the controller causes the production of an audible signal by the audio circuit when the display sample and hold circuit is enabled to create or update a display.

Figure 2:
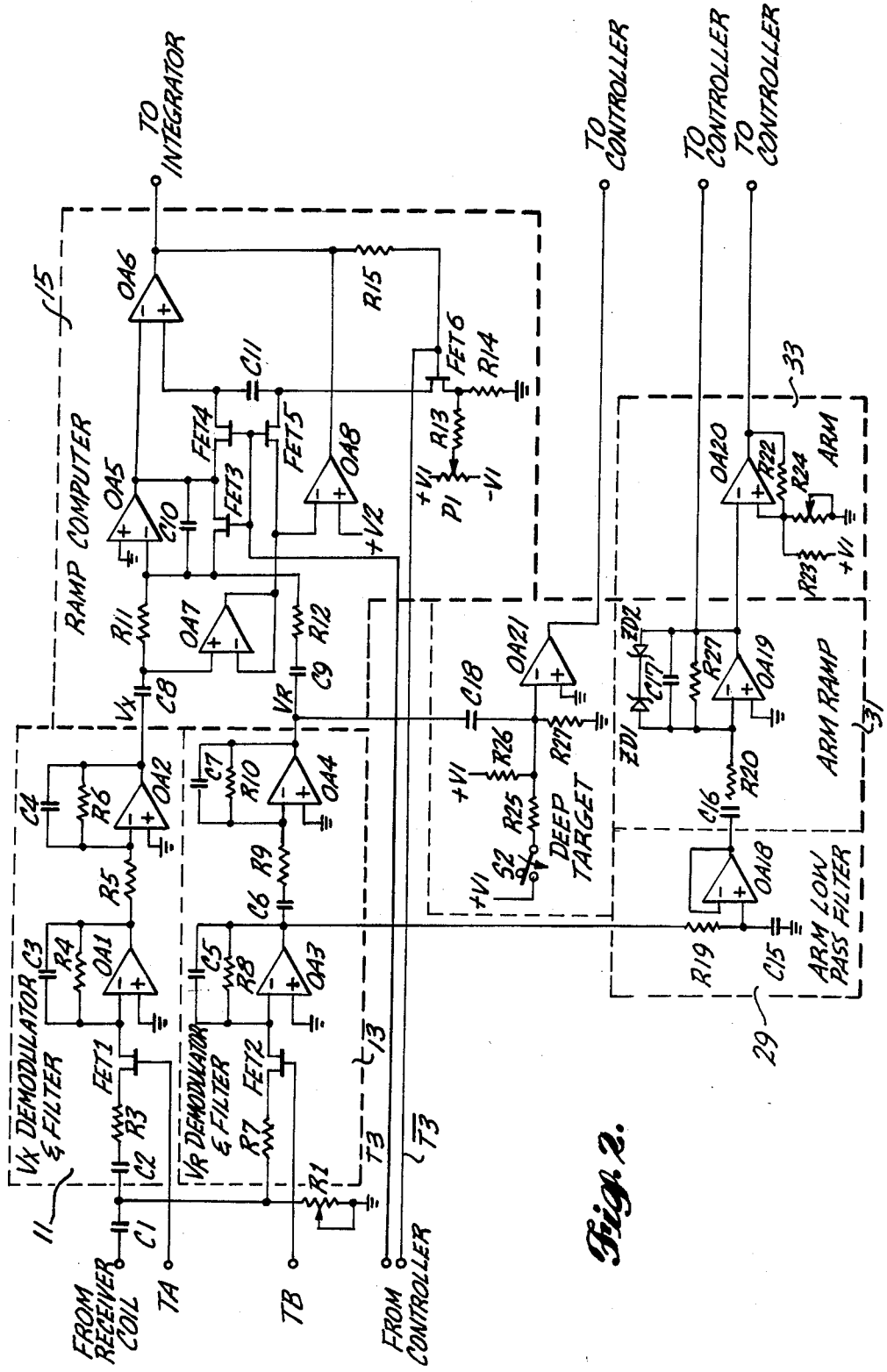
FIG. 2 is a schematic diagram of $V_X$ and $V_R$ demodulator and filters, a ramp computer, a deep target circuit, an arm low-pass filter, an arm amplifier and an arm circuit suitable for use in the signal analysis and control circuitry illustrated in FIG. 1.

FIG. 2 is a schematic diagram of a $V_X$ demodulator and filter circuit 11; a $V_R$ demodulator and filter circuit 13; a ramp computer 15; an arm low-pass filter 29; an arm amplifier 31; an arm circuit 33; and a deep target circuit 35; suitable for use in the signal analysis and control circuitry illustrated in block form FIG. 1 and heretofore described.

The $V_X$ demodulator and filter circuit 11 comprises: three capacitors designated C2, C3 and C4; four resistors designated R3, R4, R5 and R6; a field effect transistor switch designated FET1; and, two operational amplifiers designated OA1 and OA2. The junction between C1 and R1 is connected through C2 in series with R3 to the source terminal of FET1. The drain termainal of FET1 is connected to the inverting input of OA1. The gate of FET1 receives the TA signal previously described. The noninverting input of OA1 is connected to ground. C3 and R4 are connected in parallel and between the inverting input of OA1 and the output of OA1. The output of OA1 is connected through R5 to the inverting input of OA2. The noninverting input of OA2 is connected to ground. C4 is connected in parallel with R6 between the inverting input of OA2 and the output of OA2. The $V_R$ signal is formed at the output of OA2.

The $V_R$ demodulator and filter circuit 13 comprises: three capacitors designated C5, C6 and C7; four resistors designated R7, R8, R9 and R10; a field effect transistor swtich designated FET2; and, two operational amplifiers designated OA3 and OA4. The junction between C1 and R1 is connected through R7 to the source terminal of FET2. The drain terminal of FET2 is connected to the inverting input of OA3. The gate of FET2 receives the TB signal heretofore described. The noninverting input of OA3 is connected to ground. C5 is connected in parallel with R8 between the inverting input of OA3 and the output of OA3. The output of OA3 is connected through C6 in series with R9 to the inverting input of OA4. The noninverting input of OA4 is connected to ground. C7 is connected in parallel with R10 between the inverting input of OA4 and the output of OA4. The $V_R$ signal is formed at the output of OA4.

FET1 and FET2 of the $V_X$ and $V_R$ demodulator and filter circuits form the demodulation portion of these circuits. Because FET1 and FET2 are opened and closed by quadrature control signals, as previously noted the $V_X$ and $V_R$ demodulator and filter circuits are quadrature demodulators. As discussed in U.S. Pat. No. 4,507,612 referenced above, quadrature demodulators driven at the same frequency as the transmit coil of an induction balance metal detector create $V_X$ amd $V_R$ ringing signals containing information about the reactive and resistive components of the metal target that created the signals.

Each of the $V_X$ and $V_R$ demodulator and filter circuit includes a band-pass filter and a low-pass filter, which match one another. More specifically, C2, R3, C3, R4 and OA1 of the $V_X$ demodulator and filter circuit form a band-pass filter that matches a band-pass filter of the $V_R$ demodulator and filter circuit formed by C6, R9, C7, R10 and OA4. R5, C4, R6 and OA2 of the $V_X$ demodulator and filter circuit form a low-pass filter that matches a low-pass filter of the $V_R$ demodulator and filter circuit formed by R7, C5, R8 and OA3.

The ramp computer 15 comprises: four capacitors designated C8, C9, C10 and C11; five resistors designated R11, R12, R13, R14 and R15; a potentiometer designated P1; four field effect transistor switches designated FET3, FET4, FET5 and FET6; two operational amplifiers designated OA5 and OA7; and, two open collector output type comparators designated OA6 and OA8.

The $V_X$ signal produced at the output of OA2 of the $V_X$ demodulator and filter circuit is applied through C8 in series with R11 to the inverting input of OA5. The noninverting input of OA5 is connected to ground. The $V_R$ signal produced at the output of OA4 of the $V_R$ demodulator and filter circuit is applied through C9 in series with R12 to the inverting input of OA5. As a result, $V_X$ and $V_R$ are summed at the inverting input of OA5. Further, $V_X$ and $V_R$ are filtered by matched high-pass filters formed by C8 and R11 and by C9 and R12.

C10 is connected between the inverting input of OA5 and the output of OA5. The inverting input of OA5 is also connected to the source terminal of FET3. The drain terminal of FET3 is connected to the output of OA5 and to the source terminal of FET4. The output of OA5 is connected to the inverting input of OA6 and the drain terminal of FET4 is connected to the noninverting input of OA6. The junction between C8 and R11 is connected to the noninverting input of OA7. The output of OA7 is connected to the inverting input of OA7 and to the source terminal of FET5. The drain terminal of FET5 is connected to one side of C11. The other side of C11 is connected to the junction between the drain terminal of FET4 and the noninverting input of OA6. The junction between C11 and the drain terminal of FET5 is also connected to the source terminal of FET6. The drain terminal of FET6 is connected through R14 to ground. The junction between the drain terminal of FET6 and R14 is also connected through R13 to the movable contact of P1. One end of P1 is connected to a positive voltage source designated +V1 and the other end of P1 is connected to a negative voltage source designated −V1. Although of opposite polarity, preferably, +V1 and −V1 are of equal magnitude. They may be +6.5 and −6.5 volts, for example. The junction between the output of OA7 and the source terminal of FET5 is also connected to the inverting input of OA8. The noninverting input of OA8 is connected to a suitable positive voltage source designated +V2. +V2 may, equal 20 milivolts, for example. The output of OA8 is connected to the output of OA6. The junction between the outputs of OA6 and OA8 are connected through R15 to the gate of FET6. Finally, the gates of FET3, FET4 and FET5 are connected to the controller to receive the previously described T3 signal. The gate of FET6 is connected to the controller to receive the $\overline{T3}$ signal. As a result, FET3, FET4 and FET5 are closed when FET6 is open and FET3, FET4 and FET5 are open when FET6 is closed.

In operation, when FET3, FET4 and FET5 are closed by the state of T3, a ramp circuit formed by OA5 and its related circuit components R11, R12 and C10 is being reset as a result of FET3 shorting C10. As this occurs, a charge related to the magnitude of $V_X$ is being applied through OA7 and FET5 to C11. When T3 and $\overline{T3}$ switch states, C10 begins to charge resulting in a ramp signal being created on the output of OA5. The ramp slope is functionally related to the sum of the magnitudes of $V_X$ and $V_R$ as shown on line (c) of FIG. 5. The general equation defining the ramp slope is $$\frac{1}{C10}\left[\frac{V_X}{R11} + \frac{V_R}{R12}\right].$$

If R11 and R12 are the same they can be removed from this equation whereby the ramp slope is proportionally related $V_X+V_R$.

As a result of the charge on C11, which is inverted in polarity with respect to the original polarity of $V_X$, while the ramp circuit is producing a ramp signal at the inverting input of OA6, the noninverting input of OA6 is receiving a fixed voltage signal whose magnitude is a function of $V_X$. Since, initially, the magnitude of the $V_X+V_R$ ramp voltage is substantially less than the magnitude of the $V_X$ fixed voltage, the output of OA6 goes high. The output of OA6 remains high until the $V_X+V_R$ ramp voltage exceeds the $V_X$ fixed voltage. When the $V_X+V_R$ ramp voltage exceeds the $V_X$ fixed voltage, the output of OA6 shifts from a high state to a low state. The width of the pulse produced by this low high shift followed by the high low shift is a solution to the equation $$\frac{V_X}{V_X + V_R}$$

which, in turn, is a function of the phase angle of the target and, thus, a function of the identity of the target. More specifically, the value of $$\frac{V_X}{V_X + V_R}$$

is closely related to the value of the phase angle of the target creating the $V_X$ and $V_R$ values. A mathematical analysis will reveal that when suitable component values are chosen the maximum deviation of the magnitude of $$\frac{V_X}{V_X + V_R}$$

from the phase angle of a target is less than five degrees, which is within an acceptable margin of error for the present invention.

As will be readily appreciated from reviewing the foregoing description, a pulse will only be produced on the output of OA6 when the signal on the noninverting input of OA6 is positive. When the signal on the noninverting input is negative no pulse occurs. Since the signal on the noninverting input is only positive when the target is nonferrous, a pulse only occurs when a nonferrous target is detected. Ferrous targets, which create a negative signal on the noninverting input of OA6, are not detected because they do not create a pulse on the output of OA6. OA8 prevents a pulse from occurring on the output of OA6 in the unusual situation where a ferrous target has a very low $V_R$ component when compared with $V_X$.

The voltage applied to the drain of FET6 determined by the setting of P1 counteracts circuit offset voltages. That is, it has been found that the output created by a ramp computer of the type illustrated in FIG. 2 creates a display that is offset as a result of offset voltages generated in the circuit. Compensation for such a display offset is provided by the offset voltage created at the drain terminal of FET6 by R13 and P1. While the amount of offset compensation illustrated in FIG. 2 is manually set, if desired, automatic offset compensation could be provided by sensing the display voltage created by noise and electronically creating a compensating offset voltage.

Figure 3:
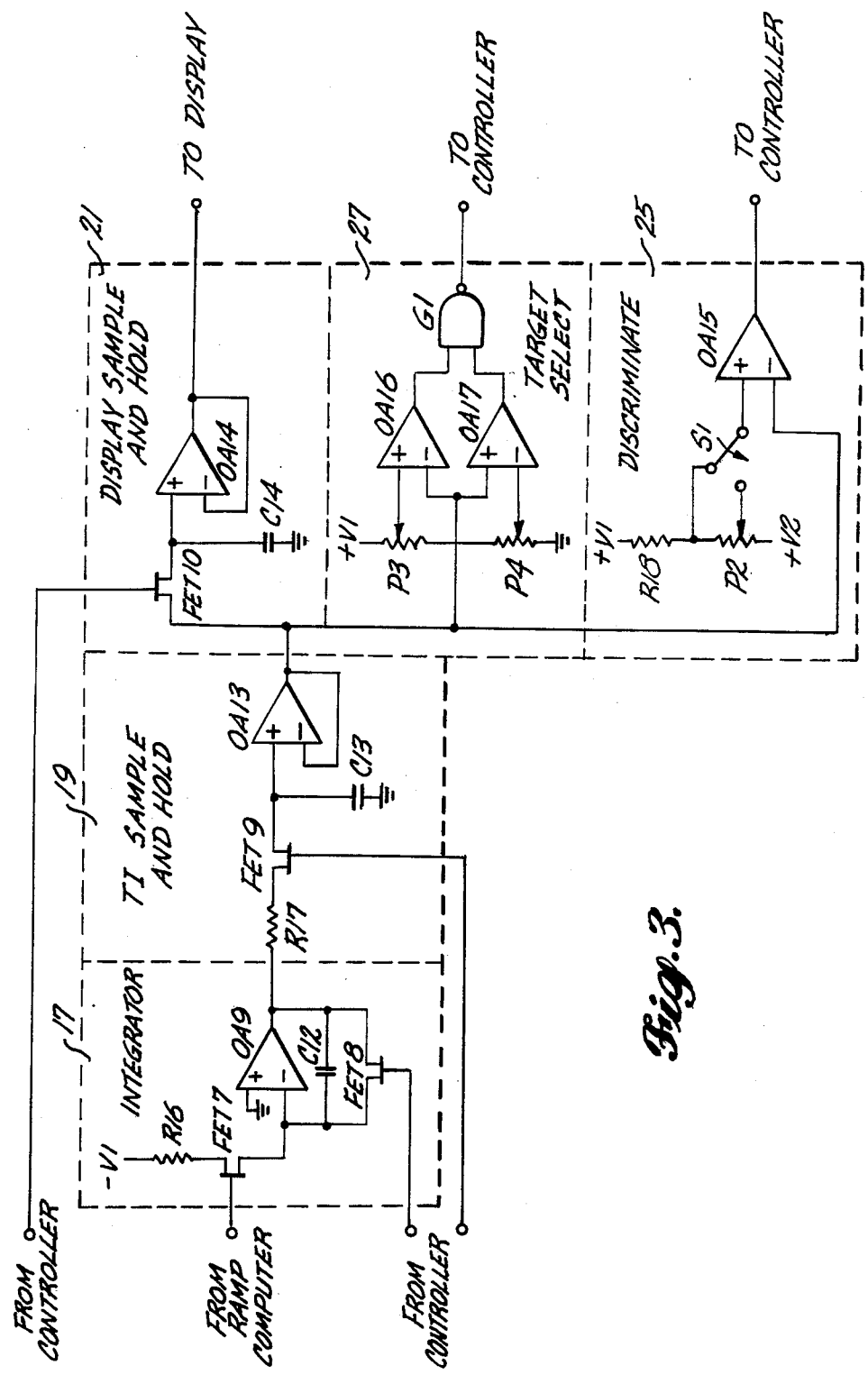
FIG. 3 is a schematic diagram of an integrator, a TI sample and hold circuit, a display sample and hold circuit, a discriminator circuit and a target select circuit suitable for use in the signal analysis and control circuitry illustrated in FIG. 1.
Figure 4:
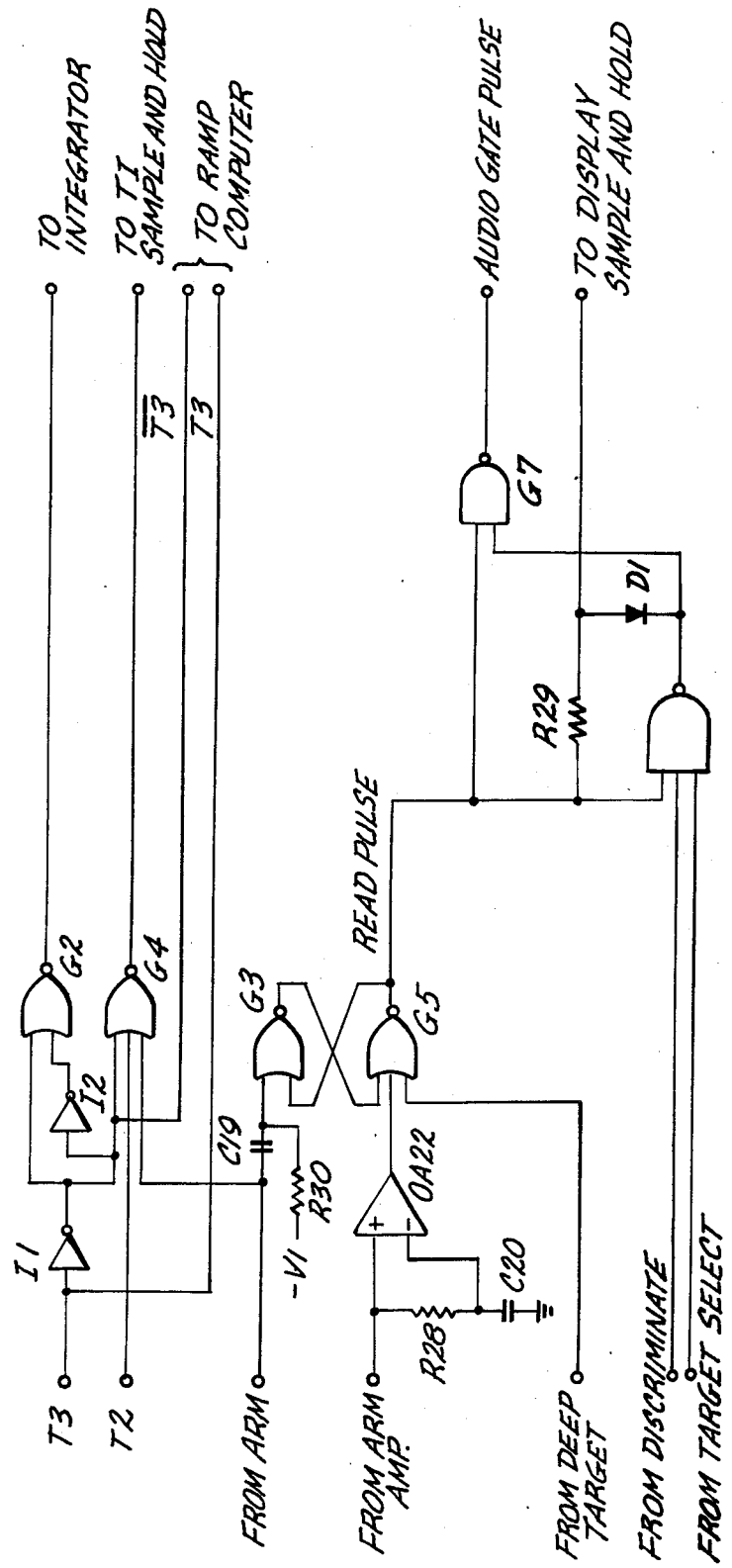
FIG. 4 is a schematic diagram of a controller suitable for use in the signal analysis and control circuitry illustrated in FIG. 1.

The integrator 17 (FIG. 3) comprises a resistor designated R16; a capacitor designated C12; two field effect transistor switches designated FET7 and FET8; and, an operational amplifier designated OA9. The variable width pulse signal produced by the ramp computer is applied to the gate of FET7. The source terminal of FET7 is connected through R16 to $-V1$. The drain terminal of FET7 is connected to the inverting input of OA9. The noninverting input of OA9 is connected to ground. C12 is connected between the inverting input of OA9 and the output of OA9. The source terminal of FET8 is connected to the inverting input of OA9 and the drain terminal of FET8 is connected to the output of OA9. The gate terminal of FET8 is connected to the controller 37 illustrated in FIG. 4 and described below. In operation, FET7 applies a fixed current determined by the values of $-V1$ and R16 to C12 for a time period dependent on the width of the pulse produced by the ramp computer. Thus, the voltage magnitude created by the integrator is a function of pulse width. The integrator is periodically reset by the controller via FET8. A pulse-by-pulse illustration of the output of OA9 is shown on line (f) of FIG. 5. The OA9 output over a full target signal cycle is illustrated on line (d) of FIG. 7. As will be readily appreciated, the only time the output of OA9 is significant is when the output of OA9 is sampled by the TI sample and hold circuit 19. During unsampled periods of time the output of OA9 is of no significance. The transfer and reset timing is such that the output of OA9 is only read when OA9 is storing a value related to the width of the TI pulse produced by the ramp computer.

The TI sample and hold circuit 19 comprises a resistor designated R17; a capacitor designated C13; a field affect transistor switch designated FET9; and, an operational amplifier designated OA13. The output of OA9 is connected through R17 to the source terminal of FET9. The drain terminal of FET9 is connected through C13 to ground and to the noninverting input of OA13. The output of OA13 is connected to the inverting input of OA13. The sample and hold circuit functions in a conventional manner. When the logic controller enables FET9, the sample and hold circuit samples the signal on the output of OA9. As illustrated in line (g) of FIG. 5, the sampling occurs shortly after the integrator has integrated the pulse produced by the ramp computer. Consequently, the sampled integrator voltage is proportional to the width of the pulse produced by the ramp computer which, in turn, is related to the phase angle of the target as heretofore described. When FET9 is open this voltage is held by C13 for sampling by the display sample and hold circuit 21, the discriminate circuit 25 and the target select circuit 27 in the manner described below. As illustrated by line (h) of FIG. 5, immediately after the output of the integrator 17 is sampled by the TI sample and hold circuit 19, the integrator 17 is reset by the logic controller applying a close control signal to FET8, resulting in C12 being shorted.

The display sample and hold circuit 21 comprises: a field affect transistor switch designated FET10; a capacitor designated C14; and, an operational amplifier designated OA14. The output of OA13 is connected to the source terminal of FET10. The gate of FET10 is connected to the controller 37. The drain terminal of FET10 is connected to the noninverting input of OA14 and through C14 to ground. The output of OA14 is connected to the inverting input of OA14. The output of OA14 is connected to the display 23. In operation, when the controller applies a close control signal to FET 10, the voltage stored by the TI sample and hold circuit 19 on C13 is sampled by the display sample and hold circuit 21. As a result, C14 is charged to the same voltage level as C13. This voltage is immediately applied to the display and controls the creation of a visual display calibrated in terms of target identity. While the controller signals that control the ramp computer, integrator and TI sample and hold circuit are repetitively produced, the close control signal applied by the controller to FET10 to cause the display sample and hold circuit to sample the signal held by the TI sample and hold circuit is not repetitively produced. Rather, the FET10 close control signal is only produced if certain conditions herein described are met.

The discriminate circuit 25 comprises: a resistor designated R18; a potentiometer designated P2; a two position switch designated S1; and, a comparator designated OA15. The output of OA13 of the TI sample and hold circuit 19 is connected to the inverting input of OA15. R18 is connected in series with P2 between +V1 and +V2. The junction between R18 and P2 is connected to one terminal of S1. A second terminal of S1 is connected to the movable contact of P2. The common terminal of S1 is connected to the noninverting input of OA15. As a result, depending upon the position of S1, OA15 compares the output of OA13 with either a fixed voltage or an adjustable voltage. The fixed voltage allows the discriminator to be set to reject signals below a factory determined voltage. The adjustable voltage allows the discriminator voltage level to be set by the operator. In either case, when the output of OA13 is below the level of the voltage applied to the noninverting input of OA15, the output of OA15 is high. When the target signal voltage rises above the voltage applied to the noninverting input of OA15, i.e., the discriminate voltage level, the ouput of OA15 goes low. When the discriminate circuit output is high, the controller is prevented from closing FET10 and creating a display unless the target select circuit overrides the action of the discriminate circuit. When the output of the discriminate circuit 25 is low, the controller is enabled to close FET10, provided other conditions are met, as discussed below in connection with the description of the controller illustrated in FIG. 4.

The target select circuit 27 comprises: two potentiometers designated P3 and P4; two comparators designated OA16 and OA17; and, a two-input NAND gate designated G1. P3 and P4 are connected in series between +V1 and ground. The adjustable terminal of P3 is connected to the noninverting input of OA16 and the adjustable terminal of P4 is connected to the inverting input of OA17. The inverting input of OA16 and the noninverting input of OA17 are connected to the output of OA13 of the TI sample and hold circuit 19. The output of OA16 is connected to one input of G1 and the output of OA17 is connected to a second input of G1. The output of G1 is connected to the controller.

In operation, when the output of OA13 lies within a voltage window determined by the voltages applied to the noninverting input of OA16 and the inverting input of OA17, the outputs of both OA16 and OA17 are both high resulting in the output of G1 being low. When the output of OA13 lies outside of the window, the output of either OA16 or OA17 is low, depending upon whether the output of OA13 is above or below the window. Either output being low causes the output of G1 to be high. Since the target selected circuit is entirely separate from the discriminate circuit, the window created by the target select circuit is obviously independent of the range of the discriminate circuit. As will be more fully understood from the folowing description of the controller illustrated in FIG. 4, this independence allows the window of the target select circuit to lie within the discriminate, i.e., reject, range of the discriminate circuit. It is this ability that allows a target identifying metal detector formed in accordance with the invention to detect and respond to targets having phase angles lying within the range of target phase angles being discriminated against by the discriminate circuit.

The arm low-pass filter 29 (FIG. 2) comprises: a resistor designated R19; a capacitor designated C15; and, an operational amplifier designated OA18. The output of OA3 of the $V_R$ demodulator and filter circuit 13 is connected through R19 in series with C15 to ground. The junction between R19 and C15 is connected to the noninverting input of OA18. The output of OA18 is connected to the inverting input of OA18. In a conventional manner the arm low-pass filter filters the output of OA3 of the $V_R$ demodulator and filter circuit 13 to remove high frequency components. Further, the arm low-pass filter creates a time delay whose value is chosen to align the end of a pulse, created by the arm circuit 33 in the manner described below, with the occurrence of the peak of a target signal on R11 and R12. The resultant relationship results in the TI analysis occurring when the target signal is the strongest.

The arm amplifier 31 comprises: two capacitors designated C16 and C17; two resistors designated R20 and R21; two zener diodes designated ZD1 and ZD2; and, an operational amplifier designated OA19. The output of OA18 of the arm low-pass filter 29 is connected through C16 in series with R20 to the inverting input of OA19. The noninverting input of OA19 is connected to ground. C17 is connected and parallel with R21 between the output of OA19 and the inverting input of OA19. The inverting input of OA19 is also connected to the anode of ZD1. The output of OA19 is connected to the anode of ZD2. The cathodes of ZD1 and ZD2 are connected together. In essence, the arm amplifier is a high gain amplifier. The diodes clip the signal if it exceeds the breakdown amplitude set by the zener diodes. While the gain of the arm amplifier is high, amplification is achieved without phase shifting. The output of the arm amplifier is applied to the arm circuit 33 and to the controller 37.

The arm circuit 33 comprises: two resistors designated R22 and R23; a variable resistor designated R24; and, an operational amplifier designated OA20. The output of OA19 of the arm amplifier 31 is connected to the inverting input of OA20. R22 is connected between the output of OA20 and the noninverting input of OA20. The noninverting input of OA20 is also connected through R23 to +V1 and through R24 to ground. As a result, the voltage input applied to the noninverting input of OA20 is adjustable. In essence, the arm circuit is a Schmitt trigger circuit that inverts the positive going portion of the output of the arm amplifier and squares the result. More specifically, as illustrated on line (c) of FIG. 5, the output of OA20 shifts from a positive voltage to a negative voltage when the output of OA19 exceeds the DC voltage set at the junction between R23 and R24. The output of the arm circuit remains low until the output of OA19 drops below zero at which time the output of the arm circuit shifts back to a positive voltage. The output of the arm circuit 33 is also applied to the controller.

The deep target circuit 35 includes: a two position switch designated S2; three resistors designated R25, R26 and R27; a capacitor designated C18; and, an operational amplifier designated OA21. +V1 is connected to one terminal of S2. The other terminal of S2 is unconnected. The common terminal of S2 is connected through R25 to the inverting input of OA21. The inverting input of OA21 is also connected through R26 to +V1, through C18 to the output of OA4 of the $V_R$ demodulator and filter circuit 13 and through R27 to ground. The noninverting input of OA21 is connected to ground. In operation, if the $V_R$ signal exceeds a predetermined level determined by the voltage at the junction between R26 and R27 and the deep target circuit is engaged as a result of S2 being open, the output of OA21 shifts from a low state to a high state to reset (or maintain reset) a latch forming a portion of the controller. As will be better understood from the following description of the controller illustrated in FIG. 4, keeping the controller latch reset prevents the target information signal from creating a display. Because the deep target circuit output only shifts from a low state to a high state when the $V_R$ signal magnitude is above a preset level, the deep target signal prevents a display from occurring when a large magnitude target signal occurs. As noted above large magnitude target signals are usually produced by shallow buried junk targets.

Figure 5:
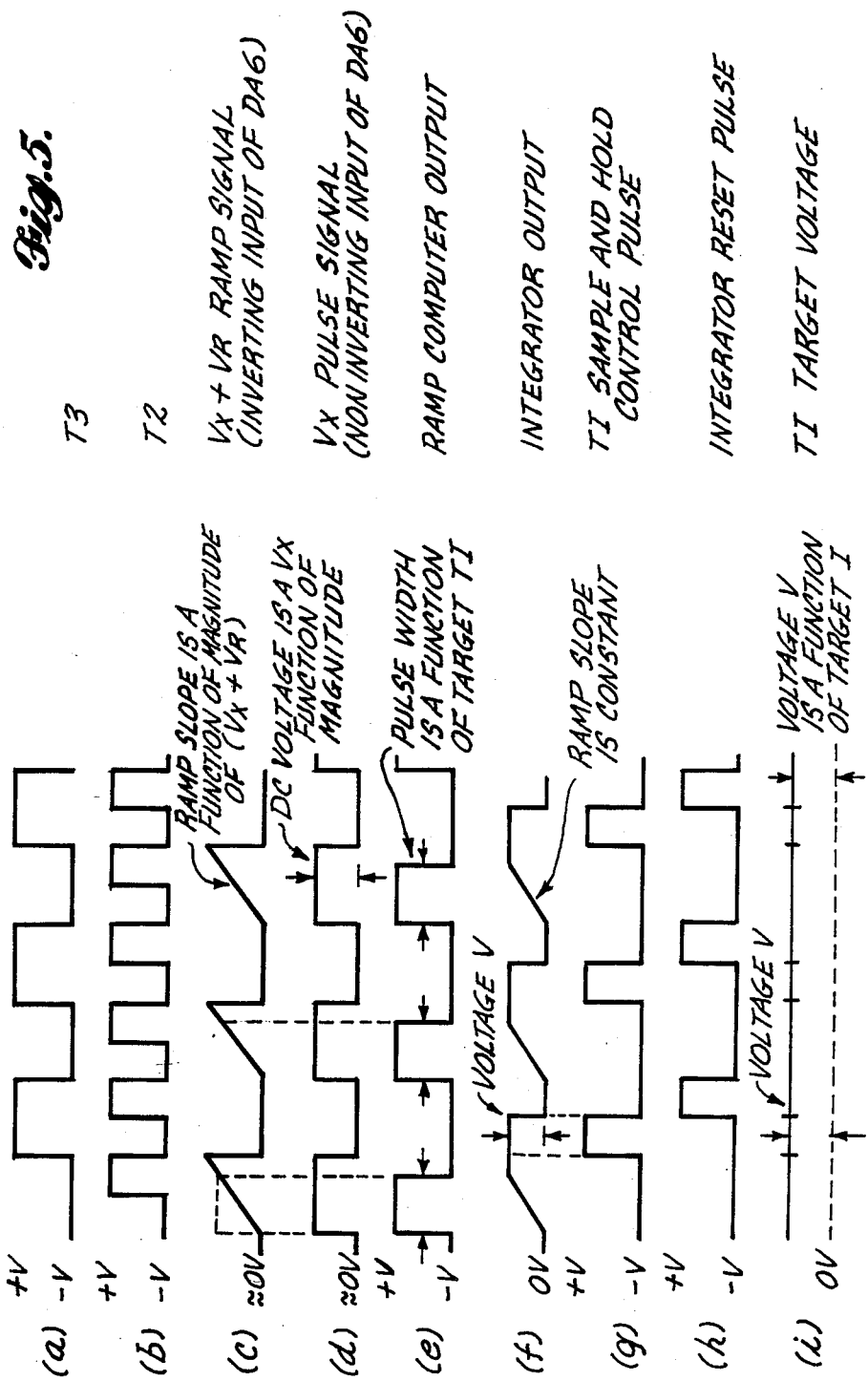
FIG. 5 is a series of waveforms illustrating the signals at various points along the TI signal path of the schematic diagrams illustrated in FIGS. 2 and 3.

The controller (FIG. 4) comprises: two inverters designated I1 and I2; two two input NOR gates designated G2 and G3; two three input NOR gates designated G4 and G5; a three input NAND gate designated G6; a two input NAND gate designated G7; three resistors designated R28, R29 and R30; two capacitors designated C19 and C20; and, a diode designated D1. T3 is applied to the input of I1, and to the ramp circuit 15 for controlling the open/closed state of ramp field affect transistor FET3, FET4 and FET5. The output of I1 is connected to one input of G2 and one input of G4. The output of I1, which is $\overline{T3}$, is also applied to the ramp circuit where it controls the operation of FET6. T2 is applied to one input of G4 and through I2 to the second input of G2. The output of G2 is applied to the control input of FET8 of the integrator 17 and, thus, controls resetting of the integrator. Because G2 combines $\overline{T3}$ and $\overline{T2}$, a reset pulse occurs every other positive pulse of T2, as illustrated in line (h) of FIG. 5. The signal produced by the arm circuit 33 (FIG. 2) is applied to the third input of G4. Since G4 combines $\overline{T3}$ and T2, G4 produces a positive pulse for every other negative pulse of T2 as illustrated on line (g) of FIG. 5, provided G4 is enabled by the output of the arm circuit being negative. If the arm circuit output is positive no pulses occur on the output of G4.

The signal produced by the arm circuit is also applied through C19 to one input of G3. The same input of G3 is connected through R30 to −V1. The output of G3 is connected to one input of G5 and the output of G5 is connected to one input of G3. The cross coupling of G3 and G5 results in the creation of the controller latch noted above. The signal produced by the arm amplifier 31 in the manner heretofore described is applied to the noninverting input of OA22 and through R28 in series with C20 to ground. The signal at the junction between R28 and C20 is applied to the inverting input of OA22. The output of OA22 is connected to a second input of G5. The third input of G5 is connected to receive the signal produced by the deep target circuit 35 in the manner heretofore described.

When the arm circuit produces a negative going square wave in the manner heretofore described, the square wave is differentiated by C19 and R30 to form a negative going pulse followed by a positive going pulse. The positive going pulse triggers the latch formed by G3 and G5 to cause the output of G5 to shift from a negative state to a positive state. This shift creates the leading edge of a read pulse. As noted above, the delay created by the arm low-pass filter is chosen such that the positive going pulse and, thus, the leading edge of the read pulse coincides when the target signal is the strongest on R11 and R12.

Figure 6:
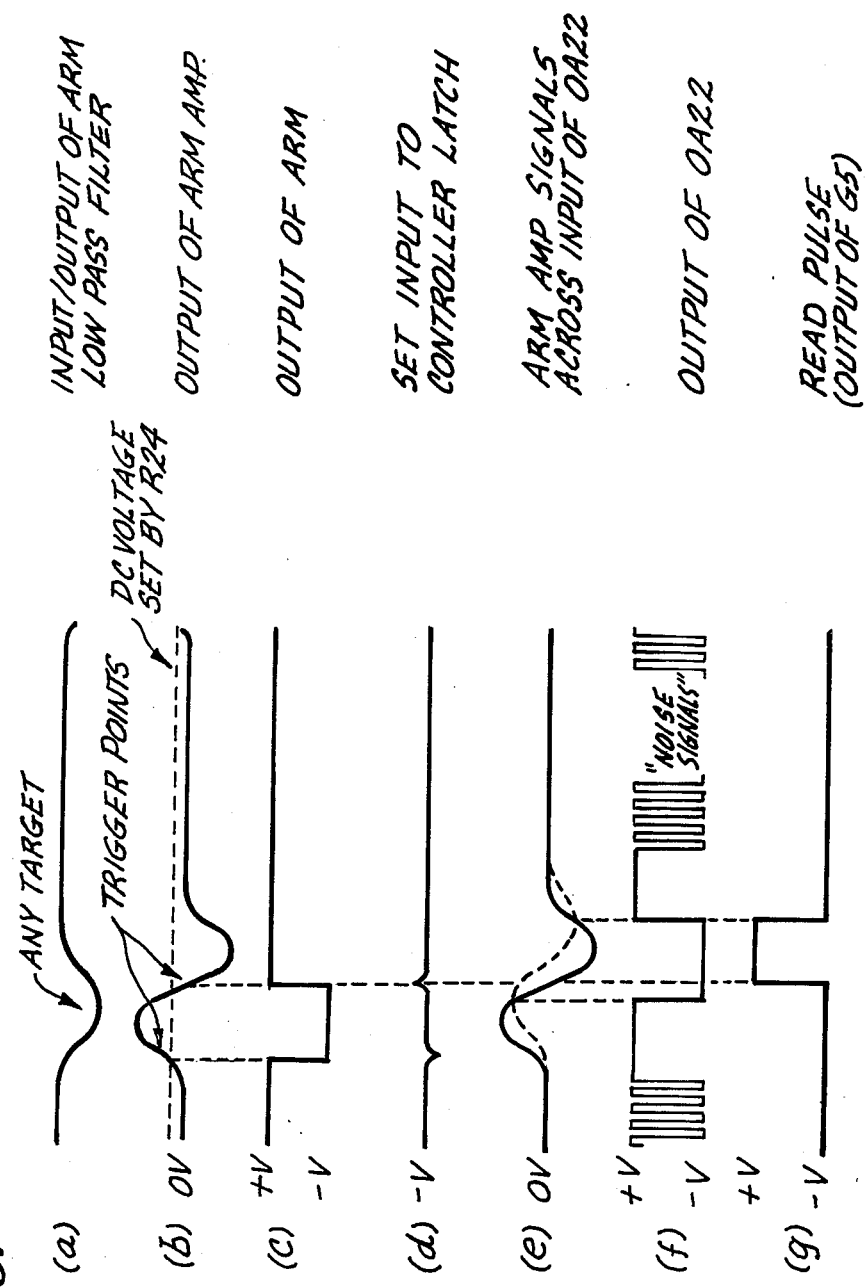
FIG. 6 is a series of waveforms illustrating the signals at various points along the arm signal path in the schematic diagrams illustrated in FIG. 2; and, FIG. 7 is a series of waveforms illustrating the signals at various points in the circuit schematic diagrams illustrated in FIGS. 2, 3 and 4.

The controller latch is reset normally by the trailing edge of a pulse produced by the arm amplifier 31. More specifically, as illustrated on line (b) of FIG. 6, the arm amplifier produces a rapid decay sinusoidal wave having a positive going section followed by a negative going section. This signal is applied directly to the noninverting input of OA22. The same signal is applied in a lower magnitude slightly delayed form to the inverting input of OA22. The two signals are shown overlaid on line (e) of FIG. 6. These related, spaced apart signals of differing magnitudes result in the output of OA22 shifting from a positive level to a negative level when the voltage applied to the noninverting input of OA22 drops below the voltage applied to the inverting input of OA22. The output of OA22 remains at a low level until the voltage at the noninverting input of OA22 later rises above the voltage at the inverting input of OA22. The resultant rectangular pulse is illustrated on line (f) of FIG. 6. It is the trailing edge of this negative pulse that resets the latch formed by G3 and G5. As a result, it is the trailing edge of the rectangular pulse produced on the output of OA22 that defines the end of the read pulse. The form of the read pulse created on the output of G5 in the manner just described is illustrated on line (g) of FIG. 6.

The foregoing discussion assumes that the signal produced by the deep target circuit remains low. As noted above this low condition occurs if the deep target circuit is disabled by S2 being closed. Contrariwise, if the deep target circuit is enabled as a result of S2 being open, this low condition occurs only if the magnitude of the target signal is below the threshold of the deep target circuit. If the detected target creates a signal on the output of the $V_R$ demodulator and filter circuit of adequate magnitude to trigger the deep target circuit, the deep target circuit resets the latch formed by G3 and G5 immediately after it is set by the arm circuit, or prevents the latch from being even momentarily set. As a result, no read pulse occurs. Hence, only targets producing normal or low magnitude signals are detected. Targets that produce high magnitude signals are ignored. In this way, shallow buried targets that tend to produce high magnitude are ignored and deeply buried targets that tend to produce lower magnitude signals are detected.

The read pulse produced at the output of G5 is applied to one input of G7 and one input of G6. The control signal produced by the discriminate circuit 25 is applied to the second input of G6 and the signal produced by the target select circuit 27 is applied to the third input of G6. The output of G6 is connected to the second input of G7. The read pulse is also applied through R29 to the anode of D1. The cathode of D1 is connected to the junction between the output of G6 and the related input of G7. The output of G7 is connected to the audio circuit 39 to enable the audio circuit to produce an audible output. The junction between R29 and D1 is connected to the gate of FET10 of the display sample and hold circuit 21. In operation, when the output of the discriminate circuit goes low because the target producing a detected signal is of interest to the operator, G7 is enabled resulting in the read pulse creating an audio gate pulse that enables the audio circuit 39 to produce an audible output. Simultaneously, the read pulse is applied via R29 and FET10 to cause the display sample and hold circuit 21 to sample and hold the TI signal stored by the TI sample and hold circuit 19. Contrariwise, if the discriminate circuit output remains high when a target signal is produced, the read pulse is prevented from creating either an audio gate pulse or closing FET10. This result occurs because the low output on G6 is held low by the high output produced by the discrimate circuit. The G6 low output disables G7 preventing an audio gate from occuring. Further, the low output on G6 pulls the FET10 side of R29 low preventing the closure of FET10 of the display sample and hold circuit 21. The only exception to a high discrimate signal preventing a display from occurring is if the target select signal has shifted low to indicate tht the target falls within the target select range. More specifically as previously described, the target select range can fall within the range of rejection set by the discriminator circuit. When this condition exists and the target signal present on the output of the TI sample and hold circuit falls within the target select range, the output of the target select signal goes low. The low output produced by the target select circuit results in the output of G6 remaining high when the read pulse occurs. The high output on G6 enables G7. As a result, an audio gate pulse is aplied to the audio circuit 39. Further, the high output on G6 prevents D1 from pulling the FET10 side of R29 low. Consequently, FET10 of the display sample and hold circuit 21 is closed resulting in the display sample and hold circuit sampling the signal stored by the TI sample and hold circuit 19 and creating a display.

As will be readily appreciated from the foregoing description, the invention provides a target-identifying metal detector that is relatively uncomplicated particularly when compared with metal detectors of the type described in U.S. Pat. No. 4,507,612 and U.S. patent application Ser. No. 556,379 referenced above. Like the target-identifying metal detector described in application Ser. No. 556,379, while not perfectly linear, the TI signal produced by the target-identifying metal detector of the present invention is linear enough to avoid the need to include a linearizing amplifier to space target redings properly on a visual display. This is accomplished in a relatively uncomplicated manner by a ramp computer that creates a pulse signal whose width is a function of target phase angle and, thus, target identity. In addition to providing an uncomplicated circuit for providing this information, the invention discriminates against a wide range of undesired signals while retaining to the ability to selectively detect signals lying within the range of discrimination that relate to desirable targets. In addition, the invention has the ability to detect only deep targets if desired. Consequently, in addition to providing a less complicated target-identifying metal detector that performs the functions of prior art metal detectors, a metal detector formed in accordance with the invention can have additional features and advantages.

While a preferred embodiment of the invention has been illustrated and described, it will be appreciated that various changes can be made therein without departing from the spirit and scope of the invention. For example, the values of R11 and R12 may be different resulting in rescaling of the display. Consequently, the invention can be practiced otherwise than as specifically described herein.

The embodiments of the invention of which an exclusive property or privilege is claimed are defined as follows:

1. A target-identifying metal detector signal analysis and control system for analyzing the signal produced by the receive coil of a metal detector when the magnetic field produced by the metal detector is disrupted by a metal target to determine the identity of the metal target based on the phase angle of the target comprising:
    (a) a demodulation subsystem for receiving the signal produced by the receive coil of a metal detector when the magnetic field produced by the metal detector is disrupted by the presence of a metal target and demodulating said signal in a phase quadrature manner to create a pair of target signals, one of said target signals, $V_R$, containing information about the resistive component of said metal target and the other of said target signals, $V_X$, containing information about the reactive component of said metal target;
    (b) a ramp computer connected to said demodulation subsystem for receiving said $V_R$ and $V_X$ signals and determining the phase angle of said metal target by creating a ramp signal whose slope is a function of the magnitude of the sum of $V_X$ and $V_R$ signals and combining said ramp signal with a fixed signal whose magnitude is a function of the magnitude of one of said $V_X$ and $V_R$ signals to create a pulse whose width is a function of the phase angle of said metal target; and,
    (c) a display subsystem connected to said ramp computer for receiving said pulse whose width is a function of the phase angle of said metal target and utilizing said pulse width information to create a display calibrated in terms of target identity.

2. A target-identifying metal detector signal analysis and control system as claimed in claim 1, wherein the magnitude of the fixed signal that is combined with said ramp signal to create said pulse whose width is a function of the phase angle of said metal target is a function of the magnitude of said $V_X$ signal.

3. A target-identifying metal detector signal analysis and control system as claimed in claim 2, wherein said demodulation subsystem includes:
    a $V_X$ demodulator and filter circuit for receiving the signal produced by said receive coil of a metal detector when the magnetic field produced by the metal detector is disrupted by the presence of a metal target for demodulating and filtering said signal to produce said $V_X$ signal; and, a $V_R$ demodulator and filter circuit for receiving the signal produced by said receive coil of a metal detector when the magnetic field produced by the metal detector is disrupted by the presence of a metal target for demodulating and filtering said signal to produce said $V_R$ signal, said $V_X$ demodulator and filter circuit and said $V_R$ demodulator and filter circuit including demodulators operated in phase quadrature and matched filters.

4. A target-identifying metal detector signal analysis and control system as claimed in claim 3, wherein said matched filters of said $V_X$ and $V_R$ demodulator and filter circuits include matched low-pass filters and matched band-pass filters.

5. A target-identifying metal detector signal analysis and control system as claimed in claim 1, wherein said ramp computer includes:

a first operational amplifier circuit for receiving said $V_X$ and $V_R$ signals, combining said $V_X$ and $V_R$ signals and producing a ramp signal whose slope is a function of the combined magnitudes of $V_X$ and $V_R$; and, a comparator for combining said ramp signal with a fixed signal whose magnitude is a function of the magnitude of said $V_X$ signal such that the output of said second operational amplifier: (i) remains at a first level during the period of time the magnitude of said ramp signal is below the magnitude of said fixed signal; and (ii) shifts to a second state when the magnitude of said ramp signal exceeds the magnitude of said fixed signal resulting in the creation of a pulse signal on the output of second operational amplifier circuit whose width is a function of the phase angle of said metal target.

6. A target-identifying metal detector signal analysis and control system as claimed in claim 5, wherein said demodulation subsystem includes:

a $V_X$ demodulator and filter circuit for receiving the signal produced by said receive coil of a metal detector when the magnetic field produced by the metal detector is disrupted by the presence of a metal target for demodulating and filtering said signal to produce said $V_X$ signal; and a $V_R$ demodulator and filter circuit for receiving the signal produced by said receive coil of a metal detector when the magnetic field produced by the metal detector is disrupted by the presence of a metal target for demodulating and filtering said signal to produce said $V_R$ signal, said $V_X$ demodulator and filter circuit and said $V_R$ demodulator and filter circuit including demodulators operated in phase quadrature and matched filters.

7. A target-identifying metal detector signal analysis and control system as claimed in claim 6, wherein said matched filters of said $V_X$ and $V_R$ demodulator and filter circuits include matched low-pass filters and matched band-pass filters.

8. A target-identifying metal detector signal analysis and control system as claimed in claim 5, wherein said display subsystem includes:

an integrator connected to the output of said ramp computer for receiving said pulse whose width is a function of the phase angle of said metal target and converting said target phase angle information from pulse width form to voltage magnitude form;

sample and hold means connected to the output of said integrator for selectively sampling phase angle information in voltage magnitude form created by said integrator and storing said information; and, display means connected to the output of said sample and hold means for displaying the phase angle information in voltage magnitude form stored by said sample and hold means.

9. A target-identifying metal detector signal analysis and control system as claimed in claim 8, including:

a discriminate circuit connected to said sample and hold means for analyzing the phase angle information in voltage magnitude form stored by said sample and hold means and producing an output signal having first and second states, said first state occurring when said voltage magnitude is above a predetermined level and said second state occurring when said voltage magnitude is below said predetermined level; and, a controller connected to said discriminate circuit for receiving the two state output signal produced by said discriminate circuit and controlling said sample and hold means such that a display signal is applied to said display only when the output of said discriminate circuit is in the state indicating that said voltage magnitude is above said predetermined level.

10. A target-identifying metal detector signal analysis and control system as claimed in claim 9, including a target select circuit connected to said sample and hold means for analyzing the phase angle information in voltage magnitude form stored by said sample and hold means and producing a two level output signal, said two level output signal being at a first level when the output of said voltage magnitude is above or below a window voltage range and at a second level when the output of said voltage magnitude lies within said window voltage range, said controller connected to said target select circuit for receiving said two level output signal and controlling said sample and hold means such that a display signal is applied to said display when said two level output signal is at said second level.

11. A target-identifying metal detector signal analysis and control system as claimed in claim 9, wherein said sample and hold means includes:

a TI sample and hold circuit connected to the output of said integrator for repetitively sampling voltage output of said integrator and storing the result; and, a display sample and hold circuit connected to the output of said TI sample and hold circuit for selectively sampling and holding the signal stored by said TI sample and hold circuit, the output of said display sample and hold circuit being connected to said display means, said display sample and hold circuit being connected to said controller such that said display sample and hold circuit only samples the signal stored by said TI sample and hold circuit when enabled by said controller.

12. A target-identifying metal detector signal analysis and control system as claimed in claim 9, wherein said demodulation subsystem includes:

a $V_X$ demodulator and filter circuit for receiving the signal produced by said receive coil of a metal detector when the magnetic field produced by the metal detector is disrupted by the presence of a metal target for demodulating and filtering said signal to produce said $V_X$ signal; and, a $V_R$ demodulator and filter circuit for receiving the signal produced by said receive coil of a metal detector when the magnetic field produced by the metal detector is disrupted by the presence of a metal target for demodulating and filtering said signal to produce said $V_R$ signal, said $V_X$ demodulator and filter circuit and said $V_R$ demodulator and filter circuit including demodulators operated in phase quadrature and matched filters.

13. A target-identifying metal detector signal analysis and control system as claimed in claim 12, wherein said matched filters of said $V_X$ and $V_R$ demodulator and filter circuits include matched low-pass filters and matched band-pass filters.

14. A target-identifying metal detector signal analysis and control system as claimed in claim 12, including an arm subsystem connected to said controller and said $V_R$ demodulator and filter circuit for producing a signal enabling the said controller to cause a display signal to be applied to said display only when the magnitude of the signal received from said one of said $V_X$ and $V_R$ demodulator and filters is above a predetermined level.

15. A target-identifying metal detector signal analysis and control system as claimed in claim 14, including a deep target circuit connected to said controller and one of said $V_X$ and $V_R$ demodulator and filter circuits for producing a signal preventing said controller from causing a display signal to be applied to said display when the magnitude of the signal produced by the selected one of said $V_X$ and $V_R$ demodulator and filters is above a predetermined level.

16. A target-identifying metal detector signal analysis and control system as claimed in claim 12, including a deep target circuit connected to said controller and one of said $V_X$ and $V_R$ demodulator and filter circuits for producing a signal preventing said controller from causing a display signal to be applied to said display when the magnitude of the signal produced by the selected one of said $V_X$ and $V_R$ demodulator and filters is above a predetermined level.

17. A target-identifying metal detector signal analysis and control system as claimed in claim 9, including an arm subsystem connected to said controller and said demodulation subsystem for producing a signal enabling the said controller to cause a display signal to be applied to said display only when the magnitude of a select one of said $V_X$ and $V_R$ signals is above a predetermined level.

18. A target-identifying metal detector signal analysis and control system as claimed in claim 17, including a deep target circuit connected to said controller and said demodulation subsystem for producing a signal preventing said controller from causing a display signal to be applied to said display when the magnitude of the signal produced by a selected one of said $V_X$ and $V_R$ signals is above a predetermined level.

19. A target-identifying metal detector signal analysis and control system as claimed in claim 9, including a deep target circuit connected to said controller and said demodulation subsystem for producing a signal preventing said controller from causing a display signal to be applied to said display when the magnitude of the signal produced by a selected one of said $V_X$ and $V_R$ signals is above a predetermined level.

* * * * *